United States Patent Office 3,128,966
Patented Apr. 14, 1964

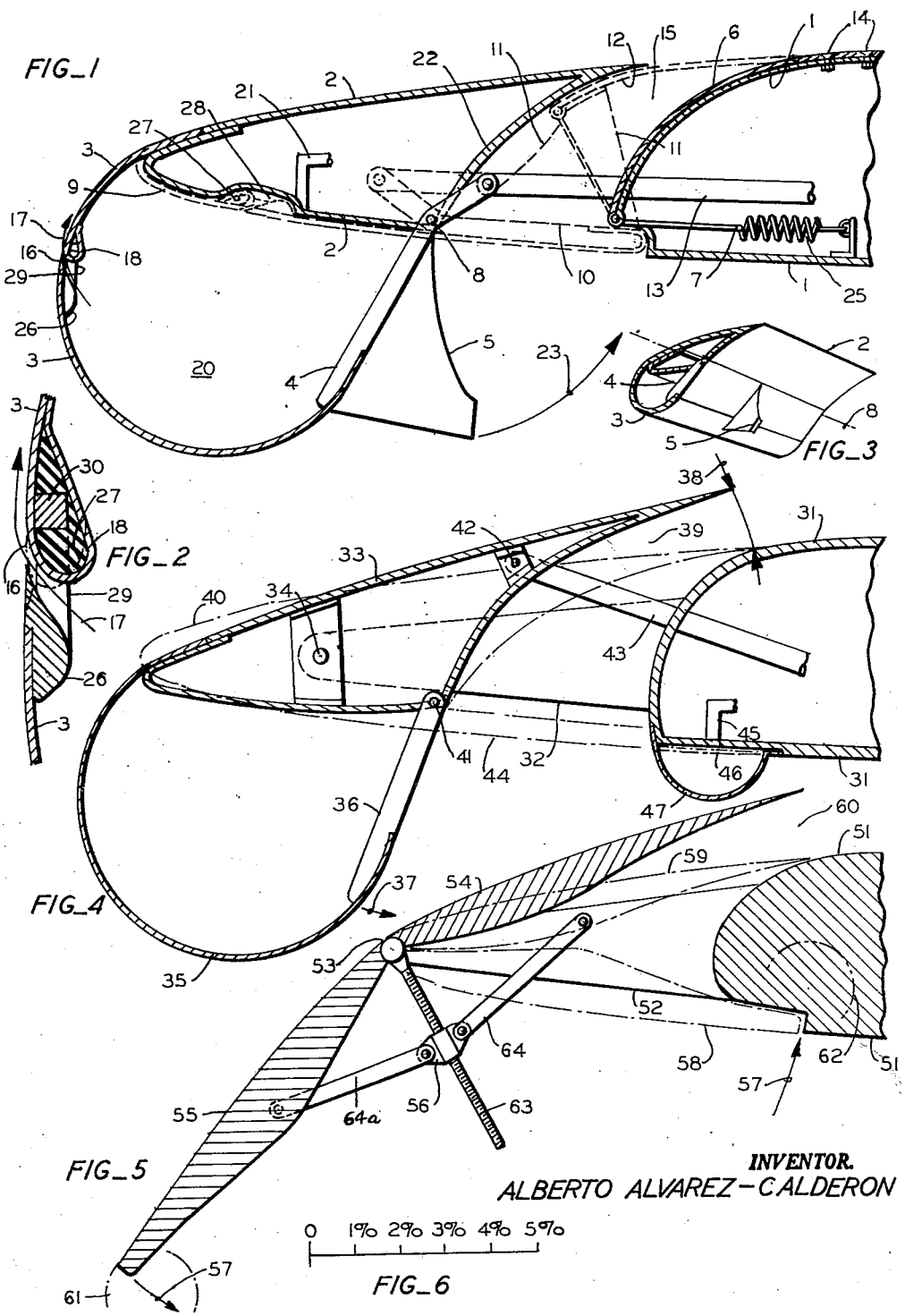

3,128,966
HIGH LIFT SYSTEM FOR AIRCRAFT WINGS
Alberto Alvarez-Calderon, 1560 Castilleja St.,
Palo Alto, Calif.
Filed Dec. 6, 1961, Ser. No. 157,423
10 Claims. (Cl. 244—42)

The present invention is related to leading edge high lift devices for aircraft wings and lifting surfaces in general. More particularly this invention is concerned with the use of collapsible high lift leading edge structures for thin high-speed wings, which structures when displaced to their high-lift position serve not only to increase the wings effective camber and leading edge radius, but also contribute to the reenergizing of the boundary layer on the upper forward surface of the wing, for instance with a wing leading edge slot. The aerodynamic advantages of high lift devices in the leading edge of wings have been known since the early days of aviation. More recently, with the development of very thin relatively uncambered high speed wings, the problems of leading edge flow deterioration in the high lift condition such as in landing, take off, climb and slow speed maneuvers, has become of serious concern to aerodynamicists and structural engineers. As a result, considerable effort has been dedicated to the attainment of a practical leading edge device suitable for thin wings. Generally speaking, from the aerodynamic viewpoint, these high lift devices may be classified in two groups. First, we have the unslotted leading edge structures which serve only to improve the geometrical shape of the cross-section of the forward part of the wing, for instance by increasing the leading edge radius and forward camber of the wing. Some well known examples of this type of structures are the drooping expanding wing leading edge devices of U.S. Patents 2,937,-826; 2,934,288; 2,912,190; 2,763,448; and the "Kruger" flap. (See page 230 of "Theory of Wing Sections" by I. H. Abbot and A. E. Von Doenhoff, Dover Publications, Inc.)

In the second group, we have leading edge structures which not only may serve to improve the leading edge geometry of the wing as in the first group, but principally are arranged so as to provide a fixed spanwise slot, or collapsible spanwise leading edge slot in the forward portion of the wing, which slot serves to reenergize the boundary layer on the upper surface of the wing and therefore extends the angle-of-attack and lift range of the airfoil beyond those values which are possible without flow-reenergizing slots.

The use of fixed slots on the leading edge of high speed wings is not advantageous because of the very high drag penalty of this type of device during high speed flight.

The use of fixed slots in high speed wings which are also provided with slot doors which can be smoothly closed and faired offer some advantages, but are difficult to construct and they do not offer a great aerodynamic improvement since they do not increase the leading edge radius and camber of a thin uncambered wing.

The best leading edge device should provide a structure capable of both having a collapsible leading edge slot and also increasing the effective leading edge camber and radius of the wing.

In the case of older wing sections of medium thickness, and relatively large camber and leading edge radius like the NACA 23012, slotted leading edge flaps or "slats" have been used having the same leading edge radius as the wing's. These flaps can be displaced forward and downward to increase the wing's effective camber and to provide a wing leading edge slot between the flap and the wing. They act thus to provide a collapsible slot. The slot is very advantageous to increase lift and angle of attack range (see for instance the NACA WR L 269).

The installation of such slotted retractable leading edge flaps or "slats," however, is not a simple matter even in 12% thick wings as it requires translation and rotation of the slat with respect to the wing. In the case of thin high speed wings such translating slotted flaps became impractical since the movement mechanisms cannot be housed within the thin wing contour. There is also the difficult matching of the translating slat with the wing in the critical leading edge portion of the wing which usually results in a large drag penalty at high speeds unless very costly methods are used for installation and maintenance. In addition, the slat itself has so little camber and small leading edge radius that the high lift gains are not as large as those that would be possible with a slat with a greater camber and leading edge radius.

It is therefore the purpose of this invention to provide a high lift leading edge structure specially suited for thin high speed airfoils in which a collapsible slat or slotted leading edge flap is provided such as to permit the use of a slat leading edge radius greater than that of the wing.

Additionally it is a purpose of this invention to provide a collapsible slat structure which when extended to its high lift position serves to increase the effective camber of the wing, and acts in unique cooperation with its supporting wing to uncover a high-lift leading edge slot between the wing and the "slat."

One more purpose of this invention is to provide a collapsible slat structure which can be extended to its high lift position by pivotal motion of its parts about pivotal axis inside the airfoil's contour and fixed with respect to the wing, which structure acts in unique cooperation with its supporting wing to increase the wing's effective camber and to open a slot between the extended slat and the wing.

One more object of this invention is to provide a collapsible inflatable leading edge structure in a wing, which structure, when inflated to its high lift position not only does it increase the effective leading edge radius and camber of the wing but acts in unique structural cooperation with the wing in order to provide a wing slot door which uncovers a wing leading edge slot between the inflated structure and the rest of the wing.

Yet one more object of this invention is to provide a collapsible inflatable tube at the leading edge of a wing which serves not only to increase the wing's leading edge radius and camber but also acts as a collapsible boundary layer control duct external to the wing proper.

These and other objects of this invention will become evident in a perusal of the following figures in which
FIGURE 1 shows a cross-sectional view in which a collapsible inflatable leading edge structure for a high speed wing is shown in its high lift inflated position acting in unique cooperation with the supporting wing in order to provide, in addition to an increased leading edge radius and camber, a collapsible flow reenergizing leading edge slot in the wing, which slot is shown also in the open position. In the figure there is also included a boundary layer control duct and nozzle on the leading edge tube.

FIGURE 2 is an auxiliary figure showing a magnified detail of the nozzle shown in FIGURE 1.

FIGURE 3 shows in isometric view another detail of FIGURE 1.

FIGURE 4 shows a somewhat different structure of a collapsible inflatable high-lift leading edge device in which the inflatable structure itself is pivoted to the wing in a fixed spanwise axis and can be deflected in angular motion to provide an additional increment of the effective camber of the wing's leading edge beyond that possible by inflation. The structure also acts in unique cooperation with the wing to open directly both the upper and lower doors of a wing leading edge slot.

FIGURE 5 shows a very simple and ingenious high-lift leading edge structure in which pivoted leading edge doors serve to increase the effective camber and chord of a wing as well as to provide a flow-reenergizing high lift leading edge slot at the wings leading edge.

FIGURE 6 shows a graphic scale in percentages of wing chord which may be used in connection with FIGURES 1, 4 and 5. With initial reference to FIGURE 1, I show a cross-sectional view of the leading edge portion of a thin high speed wing which incorporates my collapsible slotted high lift leading edge structure.

Specifically, there is shown a wing forward portion 1 and a wing leading edge portion 2 ahead of the forward portion 1. Portion 2 is conventional except that it is provided in its lower surface, with a spanwise collapsible inflatable membrane which is shown in its high lift position 3 extending from the forwardmost portion of leading edge 2 to a pivoted spanwise door 4, thereby defining a spanwise leading edge tube between the lower surface of portion 2 and the surface of membrane 3 and door 4. The tube itself may be maintained inflated under pressure supplied by air nozzle 21 into tube region 20, or by a spanwise air inlet (not shown in drawing) at one end of wing. Spanwise door 4, which forms part of the leading edge tube, is supported to wing leading edge portion 2 at spanwise axis 8, and can be displaced angularly by means of forward movement of push rod 13. Push rod 13 may be actuated by a hydraulic jack or any similar device.

The part of the structure of FIGURE 1 described so far, in the absence of the wing slot shown, would serve to increase the effective wing camber and leading edge radius of wing 1, but in no way could it reenergize the boundary layer on the wing to permit the lift increments which are well known to result from such improved devices as blown boundary layer control or slots. That part of the structure of FIGURE 1 described so far is, in fact, known in the state of the art as has been pointed out earlier in the aforementioned U.S. Patent 2,912,190 of November 10, 1959, and if desired may be constructed and operated as shown in that reference.

However, as explained in the earlier portions of this specification, it is the purpose of my invention to obtain an optimized but practical high lift leading edge structure which not only has a increased leading edge camber and radius, but a flow reenergizing air source which improves the boundary layer energy content on the flow on the upper surface of the wing.

In my structure of FIGURE 1 I show two separate but not necessarily mutually exclusive ways of accomplishing this objective.

Briefly, I show a wing slot 15 which evidently acts in unique structural and aerodynamic cooperation with the inflatable structure as I will explain hereinafter, and I also show a separate boundary layer control duct 29 and nozzle 16 which also act in unique cooperation with the inflatable structure. I will now explain in detail each of these aspects of the structure of FIGURE 1.

With reference to the wing slot, I have explained already the advantage of having slot doors both in the wing's upper and lower surfaces in order to avoid high speed drag penalties. The wing slot 2, defined between skin 22 on the leading edge portion 2, and skin 6 adjacent to forward portion 1 of the wing, is shown open.

I will first describe the slot walls, and then the slot doors and show the cooperation of the collapsible leading edge structure with the slot.

With reference to the forward slot wall, observe that spanwise door 4 and its hinge axis 8 should preferably be placed such that the external surface of 4 forms a continuation of slot toward surface 22. The shape of that slot wall should be preferably as shown in the figure. From this description, and by inspection of the figure, it can be observed then first cooperation of the collapsible inflatable structure and the slot: in the high lift position, door 4 from the collapsible structure and slot wall 22 form essentially a continuous extended undersurface of what is effectively a slotted leading edge flap provided with an expandable leading edge radius, chord and variable camber. Note however, that there has been no translation of any parts with respect to the wings.

We continue to point out the details of the slot with reference to the rear slot wall. The rear slot wall is formed by a flexible skin 6. Such a skin may be, for instance, of flexible sheet metal; and is supported to wing 1 at the upper surface of wing 1 and at the rear of the slot, for instance as shown by skin fasteners 14. This flexible skin has been provided to serve also to close the upper surface of the slot 15, for instance, when skin 6 is displaced to position 12 shown in dash lines, wherein it covers the upper gap of slot 15. Many ways exist to displace skin 6 to position 12, for instance, see one such flexible skin in U.S. Patent 2,540,045.

I now describe the methods of closing the slot door of my FIGURE 1.

In my structure of FIGURE 1, I accomplish the closing of both upper and lower surfaces of the wing slot in unique cooperation with the structure of the collapsible inflatable leading edge structure as follows: When the structure is to be collapsed push rod 13 is moved forward, whereby spanwise door 4 rotates about spanwise axis 8 along path 23 into final position 10 wherein it closes the lower gap of the wing slot completely. Membrane 3 is pulled tightly against lower surface of wing leading edge 2 into position 9 wherein it smoothly matches lower surface of wing 1. We thus observe a second unique cooperation of spanwise door 4 with the slot in that door 4, which was a necessary element for the inflatable structure, serves also, by virtue of the ingenious arrangement specified, to act as the lower slot door of the high lift flow reenergizing wing slot 15. No additional structural elements are required for the closing of the slot door.

Additionally, as shown in FIGURE 1, slot door 4 is provided with fin like members 5 located at discrete spanwise stations (see FIGURE 3 for isometric view of fin 5). Fin 5 serves as a special device which can be used to actuate the closing of the upper slot gap. As seen in the figure, slot skin 6, is fixed to wing 1 at fasteners 14, and is pulled downwards to its high-lift slot-open position shown adjacent to the forward portion of wing 1, by cable 7 and a device to pull the cable such as spring 25. The cable could have been attached to push rod 13 if desired, or a mechanical link provided between skin 6 and push rod 13. At any rate, when skin 6 is to be displaced to position 12 to close the upper gap of the slot, spanwise door 4 is closed along path 23, fin 5 evidently comes in contact with the lowermost portion of skin 6, whereby skin 6 slides against the upper edge of fin 5 and with continued displacement of door 4 to dash position 10, the fin 5 arrives to position 11 and skin 6 to position 12 (shown in dash lines), wherein said skin is secured between leading edge surface 22 and the fin. Thus, it is seen that door 4 needed for structural reasons for the collapsible leading edge structure, can be used to actuate the closing door of the wing slot. It should be mentioned in passing that the lowermost edge of skin 6 could have been provided with a spanwise tube if desired to improve its aerodynamic and structural characteristics.

Summarizing then the mode of cooperation of the collapsible structure and the slot of FIGURE 1 I observe that the collapsible structure not only produces an increment of the wing's camber and leading edge radius, but acts in singular cooperation with the wing slot to provide with no structural additions an extended, aerodynamically smooth and efficient forward surface of a contracting slot, a lower slot door for high speed flight, and but with slight addition of fixed fins like fin 5, it also serves to actuate the closing of the upper slot gap door.

I will now discuss separately the singular advantages of the leading edge collapsible structure or tube 3 with the use of blowing boundary layer control at the leading edge portion of the wing. It is well known that boundary layer control by blowing serves to increase the lift and decrease the form drag of airfoils. However, one problem of such a system is the volume required for air channels which in the past have been provided inside the wings contour, with great structural inconvenience and penalties as well as with a sacrifice to the volume storage capacity of the wing. In my collapsible leading edge tube of FIGURE 1, formed by flexible portion 3 and door 4, I used this tube, which is external to the wing surface and which requires positive internal air pressure anyway, to act as a conduit or spanwise channel to discharge boundary layer control air in the leading edge portions of the wing. The wing in this case need not have a wing slot like that shown on FIGURE 1. The boundary layer control air may be discharged by a convenient conventional spanwise nozzle located in the upper surface of leading edge of portion 2 of the wing. In this case the lower surface of 2, forward of door 4, should be made with orifices or of a porous material to permit air to flow through it from region 20 into such a spanwise nozzle. As shown on the figure, however, the boundary layer control nozzle is incorporated in the flexible spanwise membrane 3 by means of a spanwise slit 16 provided with reinforcing internal lips 18 and 26 which may be metallic spanwise members, and which also act as nozzle lips. Naturally, at discrete spanwise stations, the slot should be interrupted by thin metallic chordwise connections 29 between the lips to provide chordwise continuity of the membrane or tube 3. These connections may be rigid, or inextensible but flexible. When the leading edge membrane 3 is collapsed to the high speed position shown in dashed lines, lips 18 and 26 fit into positions 27 and 28 in spanwise recessions of lower surface of wing portion 2, and the shape of the recession of surface 2 may be such as to displace lip 18 in position 27 against lip 26 in position 28, to close the slit smoothly for low drag in the retracted position. For this purpose, the portion of lip 18 adjacent to the slit may be made of relatively soft rubber or similar material which under pressure like that of wall 2 in position 27, is deformed to close the slit smoothly. A detail of this construction is shown in FIGURE 2.

In FIGURE 2 I therefore show, on a much larger scale, the shape and construction of the nozzle lips. It is seen that lower lip 26 may be entirely metallic, and may support membrane 3 directly by a permanent adhesive bondage as shown, or by screws or any other way. Upper lip 18 is shown to consist of an internal spanwise metallic element 30, surrounded by an inner rubber lip outside of which may be bonded membrane 3 completely around the inner rubber portion if desired. Upper and lower lips are rigidly connected in this figure by means of a thin chordwise plate 29. Many of these plates should be located at discrete spanwise stations along the tube. The shape and gap of the boundary layer control nozzle is then determined by the shape of the lips and their connecting element. If the nozzzle slit is to be closed in high speed flight, lip 18 can be deformed by pressure on lip 18 by the wing-skin recession in the high speed retracted condition as explained in reference to FIGURE 1 (but not shown on FIGURE 2). Lip 18 is then moved into position 27 in FIGURE 2 wherein it seals the slit. This slit is so small, however, that it can be left open, or its effects on high speed drag minimize by shaping the external surface of lip 26 near to the slit with a slight depression such that it falls inward the lower surface of the wing contour in the high speed retracted condition.

Such an external depression is shown in FIGURE 2 by the dotted lines in lip 26.

As I already mentioned in reference to FIGURE 1 the use of blowing boundary layer control makes it unnecessary to have the wing slot present in the leading edge of the wing. It is therefore evident that the type of leading edge inflatable external tube which serves as boundary layer control duct, or its nozzle, needs not be limited to the specific structure shown in FIGURE 1, but is applicable to any known flexible tubular structures at the leading edges of wings for instance those shown in U.S. Patents 2,937,826; 2,934,288; 2,851,229 and 2,763,448. These structures may be modified to incorporate the boundary layer control structure specified in my FIGURES 1 and 2.

FIGURE 3 is an auxiliary figure showing in isometric view a portion of the collapsible leading edge structure of FIGURE 1. In the FIGURE 3 fin element 5 is shown in greater clarity in its relation to spanwise door 4, to which it is generally perpendicular. The chordwise orientation of fin 5 should preferably be aligned with the local direction of the slot flow in the high lift condition even in the case of swept wings. In order to clearly show fin 5, wing portion 1 and skin 6 have been entirely omitted in FIGURE 2.

I will now explain a modified embodiment of my invention shown in FIGURE 4. FIGURE 4 shows a pivoted camber increasing slotted leading edge flap, the flap itself being provided with a variable flap camber and leading edge radius according to the collapsible structure of FIGURE 1.

Specifically in FIGURE 4 there is shown the forward portion of a wing 31 having a fixed bracket or arm 32 extending forward and supporting at spanwise axis 34 a pivoted leading edge flap 33. Flap 33 is shown deflected downwards by an angle 38 about axis 34. In this camber increasing position, the flap trailing edge portion is deflected upward from the upper surface of the forward wing portion 31 to open a wing slot 39 between the rear undersurface of flap 38 and wing 31. The exact angular deflection 38 and upper slot gap is determined by pushrod 43 connected to flap 33 at spanwise flap axis 42 and to the wing by means of conventional suitable hydraulic jack (not shown) pivotally connected to the wing or to the pushrod that operates the slot's lower door, like pushrod 13 of FIGURE 1. The slot gap determined by the arcs of angle 38 should be of the order of 2% of the wing's chord.

Observe however, that pivoted leading edge flap 33 is not a conventional flap but is provided with a collapsible inflatable leading edge structure having in the inflated high lift position a spanwise membrane 35 and a spanwise door 36 hinged to flap 33 at spanwise axis 41. The door and membrane together with the lower surface of flap 33 ahead of door 36, define a leading edge tube which increases the leading edge radius, chord, and camber of the flap. It should be recalled that in addition the flaps angle can be varied substantially independently of the collapsible structure by angular motion of flap 33 about axis 34.

The collapsible leading edge structure of the leading edge flap can be inflated and operated as described in connection with the similar collapsible structure of FIGURE 1, therefore these details are omitted in the figure and description of FIGURE 2.

It should be pointed out, however, that in this structure of FIGURE 3, the spanwise door 36 also acts in singular cooperation with wing 31 to provide a lower slot door to the wing slot when the collapsible structure is in its high speed position. To arrive to that position, door 36 is pivoted about axis 41 along path 37 to final position 44. Flap 33 should also be moved clockwise about pivot axis 34, by an angle 38. With both of these motions, the leading edge portion has then the contour described by dash-dot lines 40 and 44. Both upper and lower slot gaps are smoothly closed and the wing section has changed from high efficient high lift wing, into a low drag, high speed wing of sharp and thin contours.

Before concluding with this description of FIGURE 4, it should be observed that separate optional inflatable spanwise tube 47 is shown at the forward lower-portion of wing 31. Its purpose is to prevent a sharp corner in the lower rear lip of the wing slot, to increase its contraction ratio, and to smooth out the local flow. It may be constructed say according to U.S. Patent 2,937,826. As shown in the drawing, it can be inflated by means of valve 45, and when collapsed, it falls into position 46 wherein it fairs smoothly with the wing's contour.

I now summarize the advantages of FIGURE 4. There is provided a slotted pivoted leading edge flap which is pivoted by a pivotal axis inside the wing's contour. Angular motion of the flap opens an upper slot door on the wings leading edge and increases the effective wing camber. In addition, however, the flap has a collapsible flap leading edge portion which serves to increase the leading edge radius, to extend a smooth contracting slot surface for the wing, to increase the flap's chord substantially, to further increase the effective camber of the wing, and finally to act in unique cooperation with the supporting wing to provide, at no extra structural element, a slot door for the lower portion of the wing slot.

I will now describe an alternate embodiment of my invention shown in the structure of FIGURE 5. Essentially, in this figure, the leading edge device is a slotted camber-and-chord increasing pivoted leading edge flap which uses two simple pivoted surfaces at the leading edge portion of a wing but no collapsible flap portions. Specifically FIGURE 5 shows a forward wing portion 51 having a forwardly protruding fixed bracket 52. Approximately at the forwardmost point of 52, this bracket supports a spanwise pivotal axis 53 which serves to connect two separate spanwise leading edge doors 54 and 55 to each other and to the wing. The spanwise doors are thus supported by the bracket and in aforementioned positions 54 and 55 are located in their high lift position. Observe that counterclockwise movement of upper door 54 from its closed position serves to open a wing slot 60 between the wing upper forward portion and the trailing edge of door 54, which slot may have a gap of the order of 2% of the wing chord. Additionally, however, the upward motion of door 54 serves to minimize the change of slope in a chordwise direction between the upper surfaces of doors 55 and 54 in the vicinity of pivotal axs 53. This is an advantageous feature and it will delay stall of the leading edge device itself, thus making it possible to increase the lift of the wing. In order to improve this feature, the chordwise position of the slot upper gap is fairly forward in the wing at about 8% of the wing chord in this example—such as to permit a relatively large angular displacement of door 54 for a given slot gap. Thus, the tangent of the angle by which 54 is displaced for high lift is of the order of .25. Upper door 54 may be operated by a pushrod similar to push rod 43 on pivoted device 33 in FIGURE 4.

Continuing the description of FIGURE 5, we observe that in the high lift position lower door 55 extends forward and downward from axis 53 to increase the chord and camber of the wing much like a "Kruger" flap. Thus, it may be installed and operated by mechanism used for that type of flaps. Such mechanisms are used in airplanes like the Boeing 707 and are well known in the art.

In my FIGURE 5, I show a worm and linkage system in which pivoted scissors 64 and 64A, are pivoted at one of their ends, to door 55 and bracket 52 respectively, and at their other ends to nut-and-bracket device 56. Turning screw 63, results in translation of bracket 56, angular displacements of the links, and motion of the lower flap door 55 about its pivotal axis. Although screw 63 is shown supported at the foremost point of bracket 52, it could have been supported further back on the bracket. Screw 63 may be operated by any convenient way, for instance with an electric motor.

It should be observed that the upward surface of lower door 55 in its high lift position forms a smooth curve with upper surface of upper door 54 when the latter is also in its high lift position. If upper door 54 is closed to position 59 and the lower door is left open, as shown in the figure, a strong change of curvature would appear in region 53 between the upper surfaces of door 55 and the closed upper door. This requires an additional local expansion of the flow and promotes early leading edge stall. Such adverse local change of curvature is typical of a "Kruger" unslotted type of flap, and in my structure is overcome by providing a pivoted upper door like 54 which smoothly blends with 55 when both doors are in the high lift condition, and in addition provides for a flow-reenergizing slot like slot 60 in the leading edge portion of the wing.

Lower door 55 may be provided, if desired, at its lowermost edge, with a cylindrical spanwise tube like tube 61.

To retract lower door 55, it is rotated in a counterclockwise direction about spanwise axis 53 by means of displacement of link 56, along path 57 into final position 58 shown in dash-dot lines. In that position, the lower flap door acts in unique cooperation with the wing structure to seal the lower gap of the leading edge slot 60. In that position, optional cylindrical tube 61 if used would have been displaced inside the wing's contour to position 62.

It can be seen that when lower door 55 is retracted to position 58 and upper door to position 59 shown in dash-dot lines, the profile of the wing becomes one with a sharp uncambered leading edge shape suitable for high speed flight.

Summarizing the advantages of FIGURE 5, we observe that by co-pivoting two spanwise leading edge doors at the leading edge of a high speed wing in the manner shown, a high speed wing profile can be converted by appropriate motion of the pivoted doors into a high lift profile having a slotted leading edge flap which also increases the camber chord and if desired, the leading edge radius of the wing.

No parts of the structure have translation with respect to the wing in this embodiment, which avoids the use of costly and heavy tracks for the leading edge device; no special slot doors are required to cover the high lift slot for high speed flight by virtue of the unique cooperation of the leading edge structure with the wing shown in this design.

It is to be understood that though my invention has been shown in the leading edge of aircraft wings, it is applicable to leading edge of stabilizers, to delta wings, to lifting surfaces like hydrofoils which are displaced in a fluid, to submarine control surfaces, to fluid intakes like the air intake of a jet engine, a ground effect machine, or a shrouded propeller, especially if the inflatable membrane is used for boundary layer control as shown in FIGURE 2 of the application. A similar collapsible tube can obviously be arranged to discharge air perpendicular to its surfaces and be used as structural means to provide peripheral jet curtains for ground effect machines and aircraft using ground effect principles for take off and landing. One example of the latter case is the use of a collapsible extensible inflatable thoroid capable of discharging a cylindrical air jet downwardly from below the edges of a flying saucer, from below a delta wing; which thoroid collapses into the airframe under its own elastic properties for high speed flight when the internal pressures are removed.

Various further modifications and alterations from those described hereinabove can obviously be made without departing from the spirit of this invention, and the foregoing are to be considered purely as exemplary application thereof. The actual scope of this invention is to be indicated by reference to the appended claims.

I claim:

1. For an aircraft wing having an upper surface, a lower surface, and a wing leading edge, the improved means for increasing the lift of the wing comprising: means defining a leading edge slot adjacent to said leading edge for conveying fluids from said lower surface to said upper surface with said slot having a fluid intake mouth in said lower wing surface and a forward slot wall surface, a spanwise intake door pivotally mounted on said wing about a spanwise pivoted axis positioned substantially between said wing leading edge and said fluid intake mouth, and means provided for moving said door between a first position covering said fluid intake mouth and a second position uncovering said fluid mouth with the surface of said door inclined in a downwardly and forwardly manner with respect to said lower wing surface and located with respect to forward slot wall surface as a forwardly and downwardly extension of said forward slot wall.

2. The structure of claim 1 further characterized in that said wing slot has a fluid exhaust mouth in the upper surface of said wing, a forward slot wall connecting the forward lips of said intake and exhaust mouths of said slot, and a rearward slot wall connecting the rearward lips of said intake and exhaust mouths of said slot, said slot walls defining a converging slot channel upwardly and rearwardly through said wing, and with said intake door positioned in its second position with its door surfaces forming a smooth extension of said forward slot wall.

3. The structure of claim 1 characterized further in that said slot has a fluid exhaust mouth in the upper surface of the wing and means are provided for closing said exhaust mouth when said intake door is moved to said first position.

4. The structure of claim 3 further characterized in that said means provided for closing said exhaust mouth comprise a flexible exhaust door having an upper downstream edge connected to the upper surface of said wing to the rear of said slot, means biasing said exhaust door downwards to open said exhaust mouth, and cam means on the intake door positioned to contact the underside of exhaust door when said lower intake door is moved to its first position.

5. The structure of claim 3 further characterized in that said means for closing said exhaust mouth comprises a spanwise exhaust door pivotally connected to said wing about a spanwise pivot axis between said wing leading edge and said fluid intake mouth, and means provided to close said exhaust door when said intake door is moved to its first position.

6. The structure of claim 5 further characterized in that said spanwise axes of said intake and exhaust doors coincide substantially at the leading edge of said wing, and in that when said doors are moved to open both intake and exhaust mouths of said wing slot, the upward outer surfaces of said doors form a smoothly curved surface inclined downward from the lower surface of said wing.

7. The structure of claim 1 further characterized in having a flexible membrane extending in a spanwise direction between the wing leading edge portion of said wing and the free end of said lower spanwise door and defining with the wing and door a plenum chamber, and means provided to introduce fluid under pressure to said plenum chamber when said lower door is moved to its second position.

8. An aircraft wing having a main wing portion and a leading edge portion pivotally supported at a spanwise axis by said main wing portion; said leading edge portion having an upper surface, a leading edge, a lower surface, a trailing surface between said upper and lower surfaces and to the rear of said leading edge, a spanwise door pivotally connected by a spanwise axis at the intersection of said lower and trailing surfaces, and a spanwise flexible membrane extending between said leading edge and the free edge of said spanwise door; and said main wing portion having an upper surface, an upstream edge and lower surface;

said pivoted leading edge portion capable of moving from a first position in which the contour of said leading edge portion with its spanwise door trailing its lower surface and its flexible membrane adjacent to the lower surfaces of said leading edge portion and said door, together with the upper and lower surfaces of said main wing portion define the contour of a low drag wing, to a second position in which said pivoted leading edge portion is rotated about its pivotal axis to a camber increasing position with respect to said main wing portion, said spanwise door is moved about its door pivotally axis downwardly and forwardly, said flexible membrane is projected outwardly under the action of internal high pressure fluid to a position in which together with said door and said leading edge portion it defines an inflated leading edge tube;

said leading edge portion further characterized in defining between the trailing surface of said leading edge portion and the upstream surfaces of said wing a leading edge slot adjacent to said leading edge portion for conveying fluids from the lower surface to the upper surface of said wing with said slot having a fluid intake mouth underneath said wing adjacent to said door and with said door pivotally connected to said leading edge portion for movement between positions where in said first position, said door covers said mouth and in said second position, said door uncovers said mouth and forms a forwardly and downwardly extension of the trailing surface of said leading edge portion.

9. An aircraft wing having a leading edge portion, an upper surface and a lower surface with a chordwise bracket protruding ahead of said leading edge portion, said bracket supporting a leading edge flap, with said flap having an upper flap surface member and a lower flap surface member connected to each other at a spanwise pivotal axis substantially parallel to and ahead of said leading edge portion and means provided to move said upper and lower flap surface members between a high speed position in which said upper and lower flap surface members together with the upper and lower surface of said wing define the contours of a low drag high speed wing having continuous surfaces, with said lower flap surface member trailing said spanwise pivotal axis below the leading edge portion of said wing and said upper flap surface member trailing said spanwise pivotal axis and inclined at a shallow angle with respect to said wing and having an upper flap surface member's trailing edge substantially immediately adjacent to one of said leading edge portion and upper surface of said wing; and a second position in which said lower flap surface member is moved by angular motion about said spanwise pivotal axis in a direction contrary to the normal local flow direction to a location in which it is ahead and below said lower surface of said wing and inclined to it and said upper flap surface member is inclined with respect to said wing at an angle greater than said shallow angle and with said upper flap surface members trailing edge away from one of said leading edge portion and upper surface of said wing; with the undersurfaces of said upper and lower flap surface members together with the leading edge portion of said wing and said upper surface of said wing defining the slot walls of a leading edge slot for upward and rearward fluid flow.

10. A wing with a leading edge flap having an upper and lower flap portions pivotally connected to each other at a spanwise axis, and means provided to move said flap portions in pivotal motion between a high speed position in which each of said flap portions trails said spanwise axis and has a trailing edge resting against said wing, and a high lift position in which said lower flap portion is ahead and below said spanwise axis and inclined to said wing and said upper flap portion has said trailing edge at a small distance away from said wing, with the undersurfaces of said upper and lower flap portions of said flap and the surfaces of said wing defining slot walls therebetween for upward and rearward fluid flow.

References Cited in the file of this patent

UNITED STATES PATENTS

| | | |
|---|---|---|
| 2,243,885 | Schweich | Jan. 3, 1941 |
| 2,373,088 | Allen | Apr. 10, 1945 |
| 2,581,229 | Clark | Sept. 9, 1958 |
| 2,755,039 | Davie | July 17, 1956 |

FOREIGN PATENTS

| | | |
|---|---|---|
| 1,003,096 | France | Nov. 14, 1951 |